(12) United States Patent
Oliver et al.

(10) Patent No.: US 7,840,546 B2
(45) Date of Patent: Nov. 23, 2010

(54) METHOD AND APPARATUS FOR CONDUCTING DATA QUERIES USING CONSOLIDATION STRINGS AND INTER-NODE CONSOLIDATION

(75) Inventors: William Oliver, Tucson, AZ (US);
Robert Griffin, Tucson, AZ (US);
Wojciech Wyzga, Tucson, AZ (US)

(73) Assignee: Knowledge Computing Corporation, Tucson, AZ (US)

( * ) Notice: Subject to any disclaimer, the term of this patent is extended or adjusted under 35 U.S.C. 154(b) by 420 days.

(21) Appl. No.: 12/139,152

(22) Filed: Jun. 13, 2008

(65) Prior Publication Data

US 2009/0177647 A1 Jul. 9, 2009

Related U.S. Application Data

(60) Provisional application No. 61/019,591, filed on Jan. 7, 2008.

(51) Int. Cl.
*G06F 17/30* (2006.01)
(52) U.S. Cl. ............... 707/705; 707/802; 707/962; 709/201; 709/212; 709/249
(58) Field of Classification Search ........... 707/609, 707/705, 802, 962, E17.048; 709/201, 212, 709/249
See application file for complete search history.

(56) References Cited

U.S. PATENT DOCUMENTS

| | | | | |
|---|---|---|---|---|
| 6,912,549 | B2 * | 6/2005 | Rotter et al. ............... | 1/1 |
| 2005/0147947 | A1 * | 7/2005 | Cookson et al. ............ | 434/154 |
| 2009/0307184 | A1 * | 12/2009 | Inouye et al. ............... | 707/2 |

OTHER PUBLICATIONS

Heather McCallum-Bayliss, Identity Resolution in a Global Environment: Fishing for People in a Sea of Names, 2004 IEEE, pp. 21-26.*
Hector Garcia-Molina, Entity Resolution: Overview and Challenges, 2004, pp. 1-2.*
Hector Garcia-Molina, Pair-wise entity resolution: Overview and challenges, 2006 ACM, p. 1.*
Lu et al, Query evaluation and optimization in deductive and object-oriented spatial databases, 1995IST, pp. 131-143.*

* cited by examiner

*Primary Examiner*—Fred I Ehichioya
(74) *Attorney, Agent, or Firm*—Oppedahl Patent Law Firm LLC

(57) ABSTRACT

Query inefficiencies are improved and entity-interrelational blindness is overcome by employing two ideas: Consolidation Strings and Inter-Node Consolidation. These ideas can be typically employed in law-enforcement records systems (such as COPLINK systems), but is certainly not limited to such an application. Consolidation Strings represent key pieces of information that are in a text/character format, and may be encrypted/hashed. A system's hierarchy of consolidation rules automatically determine if two different rows in a database actually refer to the same real-world object. These rules are NOT statistical or probabilistic in nature, thus enhancing the confidence and reliability in the results. Three general classifications of Consolidation Strings are encompassed: Those based on positive identifiers, those based on demographic information, and those based on associative information that spans multiple-entity types. Inter-Node Consolidation provides a means to facilitate the communication of updated consolidation information between data-source nodes in order to leverage the advantages of Consolidation Strings.

76 Claims, 5 Drawing Sheets

METHOD AND APPARATUS FOR CONDUCTING DATA QUERIES USING CONSOLIDATION STRINGS AND INTER-NODE CONSOLIDATION

CROSS-REFERENCE TO RELATED APPLICATIONS

This application claims priority from U.S. application No. 61/019,591, filed Jan. 7, 2008, which application is incorporated herein by reference for all purposes.

BACKGROUND OF THE INVENTION

In traditional warehousing, physically separate warehouses may exist that store regionalized or logically separate data. When a user wants to know what data exists in warehouses other than the user's local one, the user must issue separate queries to each warehouse and get results back separately. This creates a labor-intensive "hit-or-miss" guess as to where the data may be located. For example, a user does not typically know if a suspect exists in any particular warehouse, so the user must issue a query to each warehouse and wait for the database to return results or a message that nothing is found. This is extremely inefficient and time- and labor-intensive. Even if the warehouse application can automatically issue queries to the remote systems, it still must wait for the responses from each system to know if data exists.

Metadata servers and Pointer systems have been proposed, which store pointers to data that resides in disparate systems. The problem with metadata servers is that none of the detailed source data resides on the metadata server and additional queries must still be issued to the remote system in order to get any meaningful information. Additionally, metadata servers do not consider the consolidation of objects across the various sources that they point to. This means that potential relevant data may be missed because the metadata pointer system is not smart enough to know that the data is related. In other words, metadata servers cannot tell a user that entity 1 consolidates with entity 2 and has additional relationships with entity 3.

Other proposed solutions might try to employ statistical or probabilistic algorithms to cause a query system to make educated guesses to improve query efficiencies; however, such systems inherently incorporate a level of unreliability or non-confidence in the results. For example, the following court exchange can be envisioned:

Lawyer: "So, Officer, how do you know that the suspect was the same person that was in your records system?"

Officer: "Because the system told me that the suspect had a 73.27 percent chance of being the same person . . . "

Law enforcement, as well as many other industries, need accurate, actionable information—not mathematical probabilities—in addition to a system that can deliver information efficiently.

BRIEF SUMMARY OF THE INVENTION

The invention solves the problems with query inefficiencies and entity-interrelational blindness by employing two ideas: Consolidation Strings and the Inter-Node Consolidation process. These ideas can be typically employed in law-enforcement records systems (such as COPLINK systems), but is certainly not limited to such an application.

Consolidation Strings represent key pieces of information that are in a text/character (i.e., ASCII) format. A system's hierarchy of consolidation rules may automatically determine if two different rows in a database actually refer to the same real-world object. These rules are NOT statistical or probabilistic in nature, thus enhancing the confidence and reliability in the results. The invention encompasses three general classifications of Consolidation Strings: Those based on positive identifiers, those based on demographic information, and those based on associative information that spans multiple-entity types. Consolidation Strings sufficiently determine that a pair of entities in different databases, or even a pair of entities within the same database but in different records, are in fact the same entity, while still being strict enough as to not consolidate the wrong pair of entities. Consolidation Strings may be encrypted to hide original data from third parties, or alternatively, be subjected to a hash algorithm to provide data security.

The consolidation algorithm basically functions as follows: A pair of entities are deemed to "match" (consolidate) if they have two Consolidation Strings on the same priority level that are character-wise identical. The exceptions where they would not match are if the pair of entities have conflicting higher-priority consolidation rules, or if there exists an ambiguous situation, such as there are a pair of entities that do not consolidate, and a third one which could potentially consolidate with either of the first two.

Inter-Node Consolidation is a process wherein a Coplink node (which generically can be thought of as a data-source node in non-law-enforcement applications) communicates consolidation information to either another data-source node or a centralized server. The information is then run through the consolidation algorithms and information from all contributing nodes is combined. The practical effect of this is that there is a link formed in the database between all entities which are deemed to be the same. Visually, when a user is working on a GUI associated with the user's local data-source node, the application will issue a query to the local node or one query to a central server. The query will be able to determine several very important pieces of knowledge: (1) Does the person/entity of interest exist in any other Coplinks (data-source nodes) in the world? (2) How many contacts does this person/entity of interest have in these various places? (3) When was the last time (globally) that this person/entity had contact with law enforcement and where?

This information is displayed to an end-user in the form of an extra table on the person/entity detail screen. Additionally, a hyperlink is presented in this form that allows the end user to view the details of this person/entity on the other data-source nodes using a distributed-query approach.

DETAILED DESCRIPTION

First Embodiment—Optimized Data Queries Using Consolidated Strings

Figure 1:
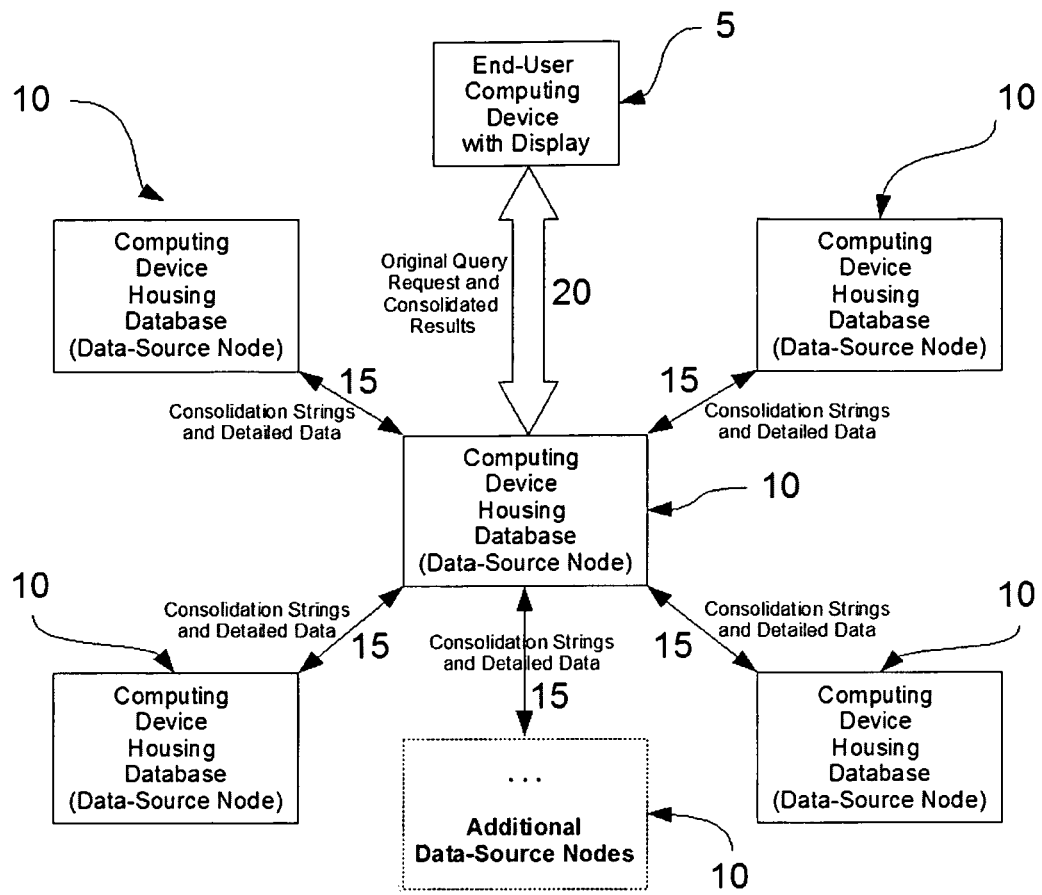
FIG. 1 depicts one embodiment of a network of computing devices and databases that use Consolidation Strings.
Figure 2:
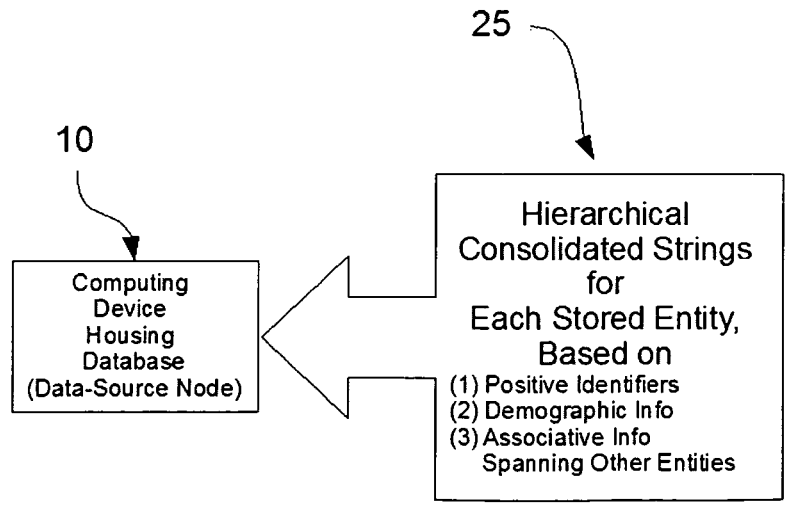
FIG. 2 depicts one embodiment of the hierarchical structure of Consolidation Strings used in a database.
Figure 3:
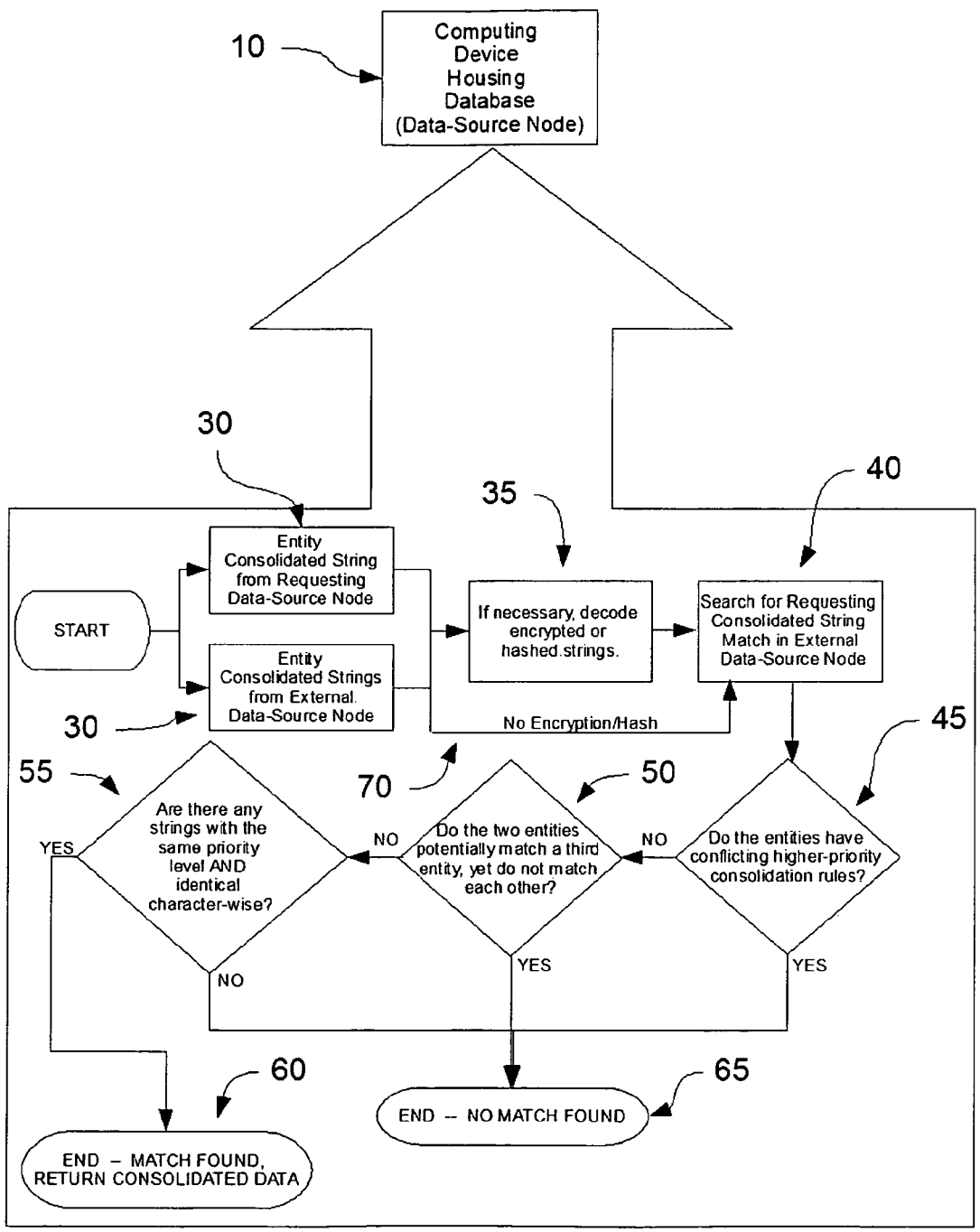
FIG. 3 depicts the internal process of a computing device employing one embodiment of a Consolidation String algorithm.

This embodiment uses at least one computing device programmed to employ Consolidated Strings for the purpose of efficiently query databases in a non-probabilistic fashion in order to maximize confidence in query results. Refer to FIGS. 1 through 3.

Different entities in a database (10) may or may not represent the same real-world entity. For example, a database may contain two different rows that describe a person/entity in different ways, but they both actually refer to the same real-world object. To ensure that these two rows have a link that ensures the human user of the database will know that these are the same person/entity, Consolidation Strings need to be used.

Consolidation Strings (25) represent key pieces of information that are in a text/character (i.e., ASCII) format. A system's hierarchy of consolidation rules (25) may automatically determine if two different rows in a database actually refer to the same real-world entity. For example, two persons have the same FBI number: This would create a Consolidation String that would match between the two rows and it will then automatically be known that these are in fact the same person and a link can be established.

It is important to note that these rules are NOT statistical or probabilistic in nature. In this approach, two records either are or are not the same based on simplistic rules. Thus, queries based on Consolidated Strings should enhance confidence and reliability in query results.

The invention encompasses three general classifications of Consolidation Strings:

1. Consolidation Strings based on positive identifiers (25), ones that are backed on biometric devices, such as fingerprints. Examples include FBI numbers, State IDs, Department of Corrections identifiers, etc. These are always higher-ranked Consolidation Strings.
2. Consolidation Strings based on demographic information (25), such as race, gender, names, and more common identification numbers that are backed by a biometric, such as social security number, driver's license number, etc.
3. Consolidation Strings based on associative information that spans multiple-entity types (25), such as the owner of a car with a particular license plate. The purpose of this is that there are many data sources which have person names, but do not keep good records of identification numbers or dates of birth. The key is that there needs to be a strong link, such as HOME or OWNER of the other object.

Consolidation Strings sufficiently determine (40) that a pair of entities in different databases, or even a pair of entities within the same database but in different records, are in fact the same entity (55), while still being strict enough as to not consolidate the wrong pair of entities [(45), (50)].

The following list provides potential Consolidation Strings for example entities:

Example Consolidation Strings

| Entity Type | Priority | Rule Name | Rule Definition |
|---|---|---|---|
| PERSON | 1 | DNA | DNAID |
| | 2 | FBI | FBIID |
| | 3 | Sate ID | SID |
| | 4 | Corrections ID | DCI |
| | 5 | County ID | LOCALID |
| | 6 | Prints | LNAME + MINIT? + FNAME + DOB + RACE + GENDER + FINGERPRINT CLASSIFICATION (HENRY 10-print?) |
| | 7 | Passport | LNAME + MINIT?+ FNAME + DOB + RACE + GENDER + PASSPORT |
| | 8 | OLN | LNAME + MINIT? + FNAME + DOB + RACE + GENDER + OLN + ISSUEAUTH |
| | 9 | SSN | LNAME + MINIT? + FNAME + DOB + RACE + GENDER + SSN |
| | 10 | Basic | LNAME + MINIT? + FNAME + DOB + RACE + GENDER |
| Associative Cross-Entry Consolidation Strings (optional) | | | |
| | 20 | Home Address | FULLNAME + CONSTR of HOME ADDRESS |
| | 21 | Car Owner | FULLNAME + CONSTR of OWNED CAR |
| | 22 | Phone Owner | FULLNAME + CONSTR of OWNED TELEPHONE |
| LOCATIONS | 1 | DEFAULT | STREETADDRESS + CITY + STATEPROV + POSTALCODE + CROSSSTREETADDRESS + CROSSCITY + CROSSSTATEPROV + CROSSPOSTALCODE |
| ORGANIZATIONS | 1 | DEFAULT | ORGNAMPK + ADDRESSPK + ORGTYPE |
| PHONES | 1 | DEFAULT | FULLPHONE |
| VEHICLES | 1 | VIN | VIN |
| | 2 | LICENSENUM | YEAR + CLASS + MAKE + MODEL + STYLE + LICENSEISSUER + LICENSENUM |

-continued

Example Consolidation Strings

| Entity Type | Priority | Rule Name | Rule Definition |
| --- | --- | --- | --- |
| PROPERTIES | 1 | SERIALNUMH1 | ISSUERABBR + ISSUERFULLNAME + SERIALNUM + SERIALNUMH1 |
| | 2 | SERIALNUM | ISSUERABBR + ISSUERFULLNAME + SERIALNUM |
| FIREARMS | 1 | SERIALNUMH1 | GUNTYPE + MINFUTYPE + SERIALNUM + SERIALNUMH1 |
| | 2 | SERIALNUM | GUNTYPE + MINFUTYPE + SERIALNUM |

Consolidation Strings (35) may be encrypted to hide original data from third-party systems. If encryption is deemed to be too unsafe, then alternatively, Consolidation Strings may be subjected to a hash algorithm to provide data security, such as a combination of cryptographic hash algorithms SHA-256 or MD5 concatenated with a checksum algorithm such as a CRC-32 or ADLER-32, or even a CRC-64. This will create a one-way hashing of the original data making obtaining of the original data impossible or practically infeasible. The only issue with using hash and CRC is that there exists the potential, however slim, that there will be collisions between two different original strings. Encryption does not have collisions, but is potentially reversible if the encryption key is discovered. A Hash (SHA-256) plus a CRC-32 in theory may produce an extremely low collision rate, which may be acceptable depending on the scope and size of the data. Additionally, if entity type and priority level are not hashed (using them as differentiators), the potential for collision should drop dramatically (70).

The consolidation algorithm basically functions as follows: A pair of entities are deemed to "match" (consolidate) if they have two Consolidation Strings on the same priority level that are character-wise identical (55). The exceptions where they would not match are if the pair of entities have conflicting higher-priority consolidation rules (45), or if there exists an ambiguous situation, such as there are a pair of entities that do not consolidate, and a third one which could potentially consolidate with either of the first two (50).

Second Embodiment—Optimized Data Queries Using Inter-Node Consolidation

Figure 4:
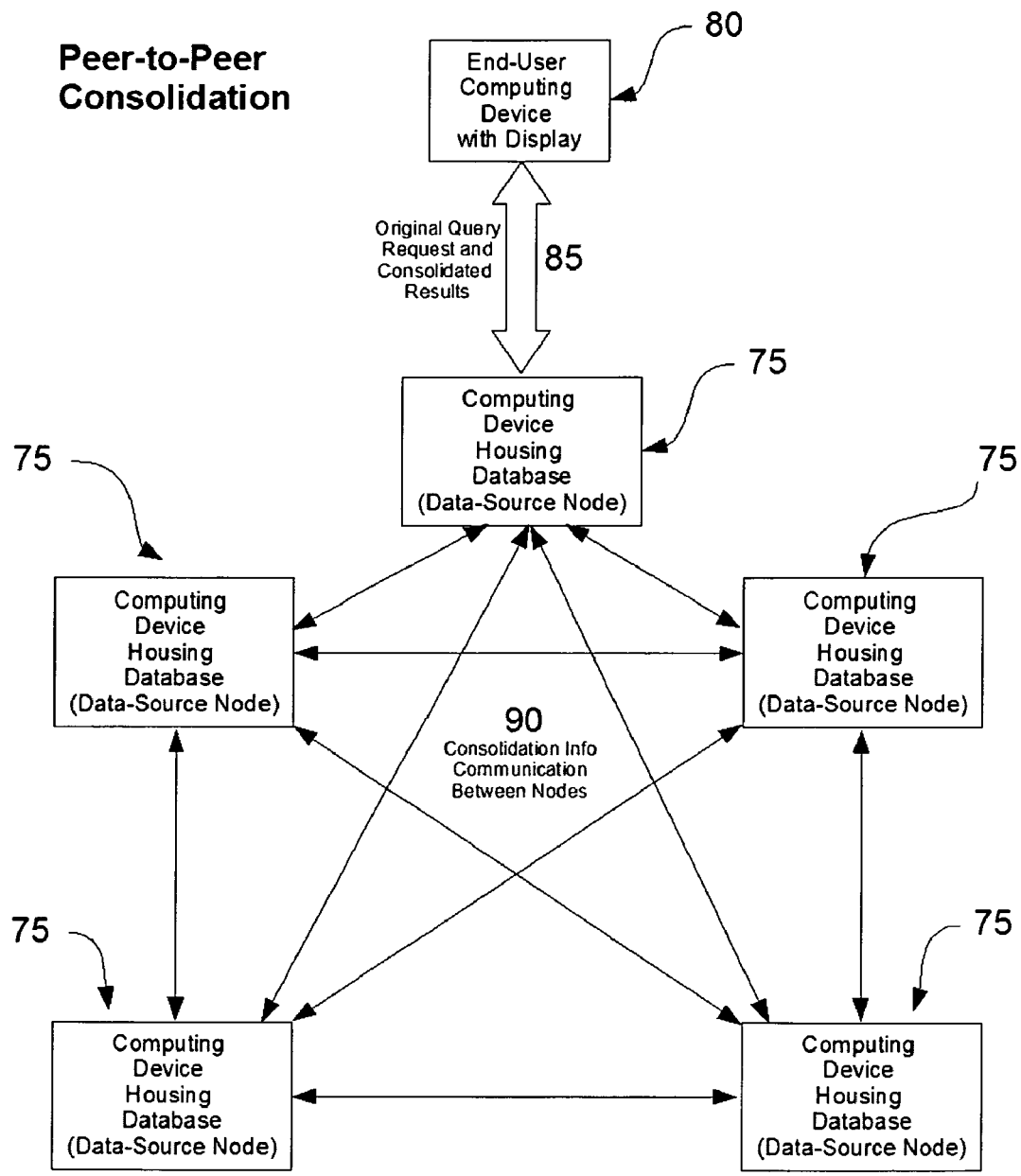
FIG. 4 depicts one embodiment of peer-to-peer node consolidation.
Figure 5:
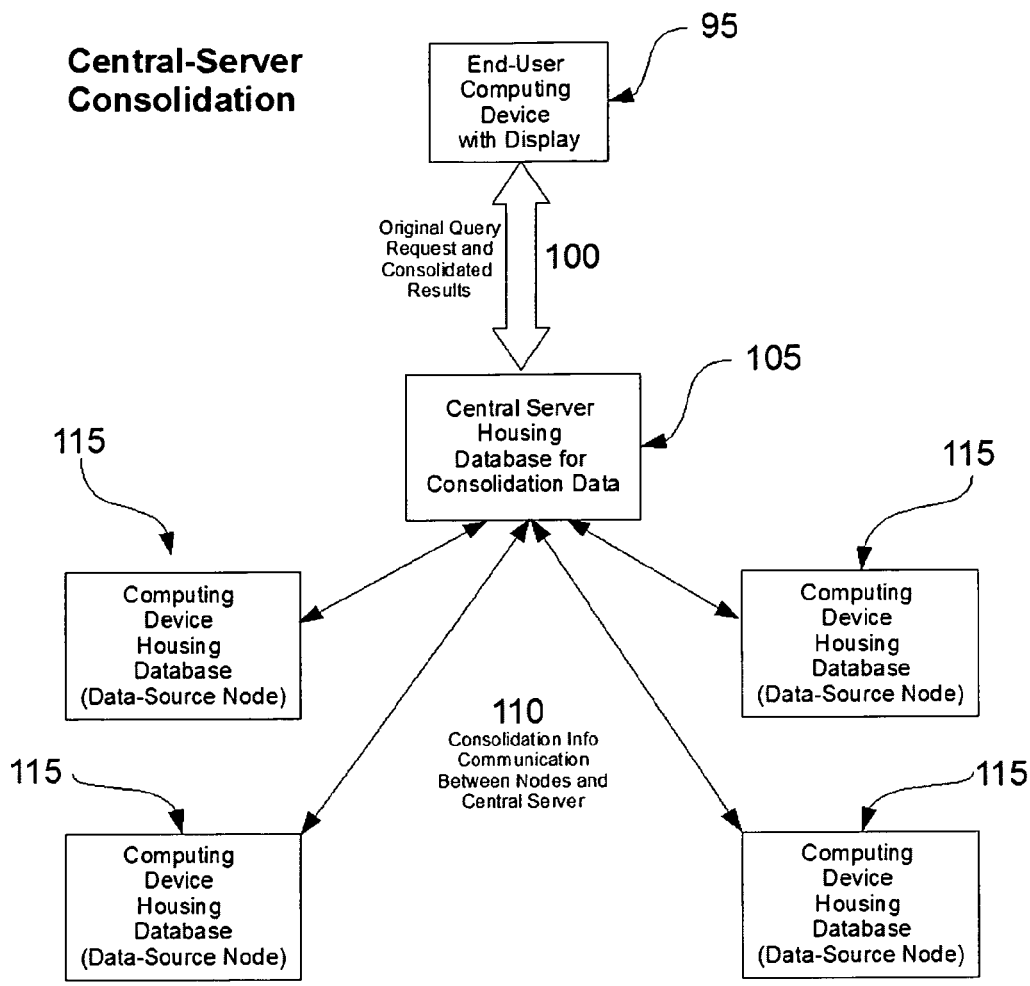
FIG. 5 depicts one embodiment of central-server node consolidation.
Figure 6:
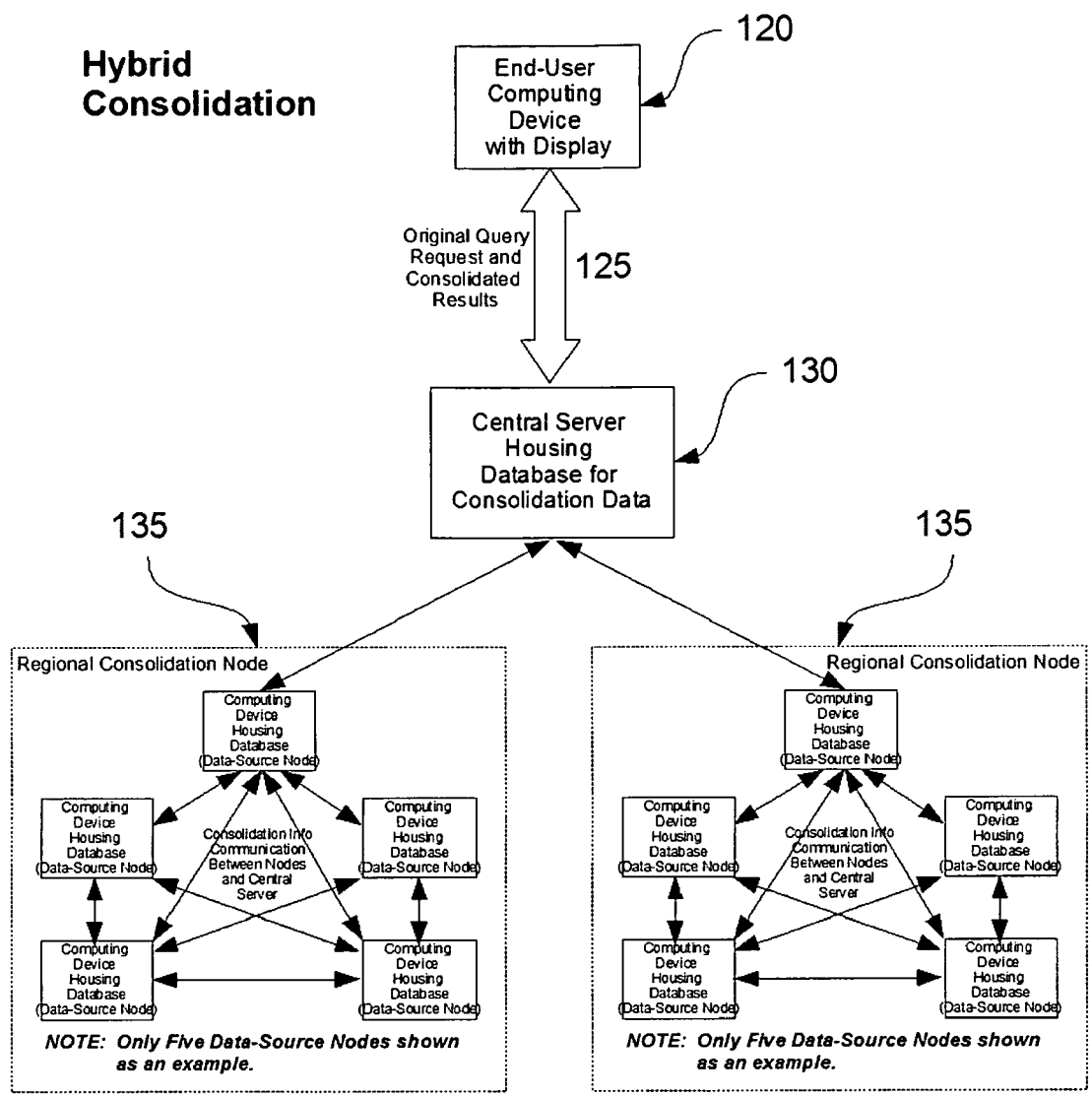
FIG. 6 depicts one embodiment of hybrid node consolidation.

This embodiment builds upon the First Embodiment disclosed above and uses at least one computing device communicatively coupled with a system of at least one database programmed to employ Inter-Node Consolidation. This embodiment is directed to a law-enforcement-related system of databases, as an example, but is the principles disclosed herein are not limited to such a specific application. Refer to FIGS. 4 through 6.

Inter-Node Consolidation is a process wherein a Coplink node (hereafter referred to as a data-source node) (75) communicates consolidation information (90) to either another data-source node (75) or a centralized server. The consolidation information (90) is then run through the consolidation algorithms (see the First Embodiment above) and information from all contributing nodes is combined. The practical effect of this is that there is a link formed in the database between all entities which are deemed to be the same. Visually, when a user is working on a GUI associated with the user's local data-source node, the application will issue a query to the local node (if peer-to-peer [FIG. 4], discussed later in this embodiment) or one query to a central server (if central-server-setup [FIG. 5], discussed later in this embodiment). This query will be able to determine several very important pieces of knowledge:
 (1) Does the person/entity of interest exist in any other Coplinks (data-source nodes) in the world?
 (2) How many contacts does this person/entity of interest have in these various places?
 (3) When was the last time (globally) that this person/entity had contact with law enforcement and where?

This information is displayed to an end-user in the form of an extra table on the person/entity detail screen. Additionally, a hyperlink is presented in this form that allows the end user to view the details of this person/entity on the other data-source nodes using a distributed-query approach.

This embodiment is not limited to persons, or to law-enforcement applications for that matter. It can also be used for organizations, locations, firearms, vehicles, etc. This ability to view where the entity has had contact, how much contact, and when, provides very useful knowledge to an investigator, especially if they are working on a time-sensitive basis.

The information that is pushed from the data-source node to the receiver (peer or central server) consists of:
 All of the Consolidation Strings (plain text, encrypted, or hashed) of the entity
 The number of documents (or contacts) this person has had with local law enforcement
 Source-record identifiers
  Such that the system can be able to de-consolidate, if Consolidation Strings change in the source nodes; and
  Such that the system can perform a query back to the source systems to get more information.

Inter-Node Consolidation can be set up in two ways: First, Consolidation Strings may be moved between data-source nodes in a peer-to-peer fashion (FIG. 4). Secondly, Consolidation Strings may be passed to a central repository (FIG. 5) instead of peer-to-peer. Each option has its advantages and disadvantages, as discussed below.

In peer-to-peer consolidation, Consolidation Strings are generated when new pieces of information are added to the information warehouse (75). Either in real-time or in a batch process, these Consolidation Strings can be passed to the peer data-source nodes via network (90), such as FTP or TCP/IP communications, or via physical storage such as disk drives that are manually transported to the peer systems.

Once the Consolidation Strings have reached peer destinations, they are loaded into special consolidation tables. A consolidation algorithm is applied (see the First Embodiment) that matches Consolidation Strings of the local node to the ones from remote systems. If a pair of entities are determined to be the same, a reference is formed in this system.

Updates happen on a periodic basis. The simplest way to update peer nodes is to push update information to all peer nodes at the same time. This would eliminate the need to keep track of which nodes have been updated and when. In the event that a node is unavailable (network or server outage, for example), these update messages should be queued and pushed once the service is available again.

In central-server consolidation, Consolidation String packets are moved to a centralized hub (105) physically located someplace separate from all of the other data-source nodes (115). On a periodic basis, the remote nodes (115) send the consolidation packets to the central server (105). The advantage of this method over peer-to-peer consolidation is that only one server has the consolidation information, thus reducing each individual node's disk and memory requirements. Secondly, there is less network traffic overall, since each node does only one push (110). Conversely, in peer-to-peer consolidation each node does N pushes (where N is the number of connected nodes), thus resulting in N*N network updates. Again, update messages are queued if network or server services are unavailable.

There is another alternative to peer-to-peer consolidation and central-server consolidation: hybrid consolidation (FIG. 6). Hybrid consolidation is a mixture of peer-to-peer consolidation (135) and central-server consolidation (130), where there are regional consolidation nodes that do not (or cannot) contribute to the global central server. In this case, some nodes communicate directly with each other, and some nodes communicate with a central server. This means that update information is pushed twice (once to the peer, and once to the central server), and that the application will issue two queries and show two tables of information of where the subject entity exists. Alternatively, the two query results could be combined to show a single GUI table to the user, even though logically, the two separate tables of query results still exist.

For example, an end-user of a Coplink application that uses Inter-Node Consolidation would typically experience the following:

User logs into the Coplink application.

User uses the Coplink search screens to query their local node for potential suspect persons, vehicles, etc.

Once the user determines that a specific entity is interesting, the user may click a link to ask the system for a "details" page, which lists all of that entity's information contained in the system. This would list all AKAs, demographics, documents, relations, etc. The information display likely would employ a collapsible user-interface table, with "drop-down" capabilities for displaying the table or parts of the table.

Upon opening the table, the user's Coplink application will request the local Coplink server to automatically initiate a query to the remote Inter-Node Consolidation server to determine if there are any entities in any contributing systems that would match (consolidate) with the current entity of interest.

The query would then return a list of entities whose Consolidation Strings match, which in turn will be translated into a table on the GUI. The table will include the following columns:

Short description of the entity

Name of the remote Coplink node that contains the entity

Number of documents this entity has in the remote system

Date of latest contact

Link to allow the user to query that remote system for the details of this object (if access is permitted by the remote node)

Link to allow the user to use this object in the analytics with objects in the current node (if access is permitted by the remote node)

Third Embodiment—A System for Optimizing Data Queries Using Consolidated Strings This embodiment encompasses a system for optimizing data queries for related records in a reliable fashion using Consolidation Strings. Refer to FIGS. 1 through 3. The basic system is comprised of:

at least one computing device [(5), (10)], wherein each computing device is communicatively coupled [(15), (20)] with the other computing devices [(5), (10)] in a network;

at least one database (10), wherein each computing device [(5), (10)] is able to communicate with the database, and wherein the database(s) store(s) records of real-world entity data;

a hierarchical system of Consolidation Strings [(15), (25)] for each database, wherein each Consolidation String in the hierarchical system represents one or more key pieces of information relating to a real-world entity stored in the database, and wherein the information represented in each Consolidation String (30) is in a character format, and wherein the hierarchical ranking of Consolidation String priorities (25) are used to optimize database queries to find matching records for the entity of interest with substantial certainty; and wherein an entity-record match between databases (10) will be found and the matching entity records are consolidated from an end-user's point of view, if a pair of entity records have Consolidation Strings on the same priority level that are character-wise identical [(40), (55)].

The basic system can be further extended, wherein an entity-record match between databases will not be found if the pair of entities in question have conflicting higher-priority consolidation rules (45).

The basic system can be further extended, wherein an entity-record match between databases will not be found for condition where the pair of entities in question do not consolidate, but a third entity exists that could potentially consolidate with either of the first two entities, wherein this condition is considered an ambiguous situation (50).

The basic system can be further extended, wherein the highest-ranked Consolidation Strings are based on positive identifiers (25).

The basic system can be further extended, wherein intermediate-ranked Consolidation Strings are based on demographic information (25).

The basic system can be further extended, wherein the lowest-ranked Consolidation Strings are based on associative information that spans multiple-entity types (25).

The basic system can be further extended, wherein the highest-ranked Consolidation Strings are based on positive identifiers, the intermediate-ranked Consolidation Strings are based on demographic information, and the lowest-ranked Consolidation Strings are based on associative information that spans multiple-entity types (25).

The basic system can be further extended, wherein each Consolidation String is encrypted to hide original data from third-party systems (35).

The basic system can be further extended, wherein each Consolidation String is subjected to a hash algorithm to help ensure data security and integrity (35). This hash algorithm can be a cryptographic hash algorithm concatenated with a checksum algorithm. Moreover, the cryptographic hash algorithm can be SHA-256 or MD5, and the checksum algorithm can be CRC-32, ADLER-32, or CRC-64.

Query optimization can be enhanced wherein the record entity type and priority level are not hashed, and wherein the record entity type and priority level are used as differentiators (70).

Fourth Embodiment—A Method for Optimizing Data Queries Using Consolidated Strings This embodiment encompasses a method for optimizing data queries for related records in a reliable fashion using Consolidation Strings. The basic method steps are comprised of:

- providing at least one computing device [(5), (10)], wherein each computing device is communicatively coupled (15) with the other computing devices (10) in a network;
- providing at least one database (10), wherein each computing device (10) is able to communicate with the database, and wherein the database(s) store(s) records of real-world entity data;
- creating a hierarchical system of Consolidation Strings [(15), (25)] for each database, wherein each Consolidation String in the hierarchical system represents one or more key pieces of information relating to a real-world entity stored in the database, and wherein the information represented in each Consolidation String (30) is in a character format, and wherein the hierarchical ranking of Consolidation String priorities (25) are used to optimize database queries to find matching records for the entity of interest with substantial certainty; and
- finding an entity-record match between databases (10) and consolidating the matching entity records from an end-user's point of view, if a pair of entity records have Consolidation Strings on the same priority level that are character-wise identical [(40), (55)].

The basic method can be further extended, wherein an entity-record match between databases will not be found if the pair of entities in question have conflicting higher-priority consolidation rules (45).

The basic method can be further extended, wherein an entity-record match between databases will not be found for condition where the pair of entities in question do not consolidate, but a third entity exists that could potentially consolidate with either of the first two entities, wherein this condition is considered an ambiguous situation (50).

The basic method can be further extended, wherein the highest-ranked Consolidation Strings are based on positive identifiers (25).

The basic method can be further extended, wherein intermediate-ranked Consolidation Strings are based on demographic information (25).

The basic method can be further extended, wherein the lowest-ranked Consolidation Strings are based on associative information that spans multiple-entity types (25).

The basic method can be further extended, wherein the highest-ranked Consolidation Strings are based on positive identifiers, the intermediate-ranked Consolidation Strings are based on demographic information, and the lowest-ranked Consolidation Strings are based on associative information that spans multiple-entity types (25).

The basic method can be further extended, wherein each Consolidation String is encrypted to hide original data from third-party systems (35).

The basic method can be further extended, wherein each Consolidation String is subjected to a hash algorithm to help ensure data security and integrity (35). This hash algorithm can be a cryptographic hash algorithm concatenated with a checksum algorithm. The cryptographic hash algorithm can be SHA-256 or MD5, and the checksum algorithm can be CRC-32, ADLER-32, or CRC-64.

Query optimization can be enhanced wherein the record entity type and priority level are not hashed, and wherein the record entity type and priority level are used as differentiators (70).

Fifth Embodiment—A System for Optimizing Data Queries Using Inter-Node Consolidation This embodiment encompasses a system for optimizing data queries for related records in a reliable fashion using Consolidation Strings and Inter-Node Consolidation. Refer to FIGS. 1 through 6. The basic system is comprised of:

- at least one computing device [(5), (10)], wherein each computing device is communicatively coupled [(15), (20)] with the other computing devices [(5), (10)] in a network;
- at least one database (10), and wherein each computing device [(5), (10)] is able to communicate with the database, and wherein database(s) store(s) records of real-world entity data;
- a hierarchical system of Consolidation Strings [(15), (25)] for each database, wherein each Consolidation String in the hierarchical system represents one or more key pieces of information relating to a real-world entity stored in the database, and wherein the information represented in each Consolidation String (30) is in a character format, and wherein the hierarchical ranking of Consolidation String priorities (25) are used to optimize database queries to find matching records for the entity of interest with substantial certainty, and wherein Inter-Node Consolidation is set up for each database, acting as a data-source node in the overall system, by periodically communicating its Consolidation Strings to external data-source nodes; and
- an end-user interface that facilitates the ability to connect to a local data-source node [(80), (95), or (120)], which allows the end-user to query the local data-source node [(75), (105), or (130)], which in turn queries any associated Consolidated Strings associated with the query for the entity to identify related records contained in other data-source nodes [(75), (115), or (135)], wherein the local data-source node communicates consolidation information to an external data-source node, and wherein the consolidation information is applied against a consolidation algorithm, and wherein the consolidation algorithm [(40), (45), (50), and (55)] looks for two entity records with Consolidation Strings on the same priority level that are character-wise identical, and when such an entity match is found, the matching entity records are consolidated from an end-user's point of view (60).

The basic system can be further extended, wherein the query is able to determine whether the entity of interest has a data record in any of the other data-source nodes [(75), (115), or (135)] in the system.

The basic system can be further extended, wherein the query is able to determine how many contacts or records the entity of interest has in any of the other data-source nodes [(75), (115), or (135)] in the system.

The basic system can be further extended, wherein the query is able to determine the last time that the person or entity of interest had contact with law enforcement and where.

The basic system can be further extended, wherein the consolidated query results are displayed in the end-user interface [(80), (95), or (120)] in the form of an extra table in the detail screen for the entity of interest. Additionally, a hyperlink can be provided in the consolidated query results to allow an end-user to view further details for the entity of interest on other data-source nodes, using a distributed-query approach.

The basic system can be further extended, wherein the system is configured for use in law-enforcement applications, organization-related applications, real-estate-related applications, location-related applications, firearms-related applications, or vehicle-related applications.

The basic system can be further extended, wherein the periodic communication of Consolidated Strings [(90) or (110)] to external data-source nodes [(75), (115), or (135)] consists of all the local data-source node's Consolidated Strings and source-record identifiers [(90) or (110)], and wherein a data-source node [(75), (115), or (135)] is allowed to deconsolidate if there are changes in the other data-source node, and a data-source node can query back to querying data-source nodes to get more information.

The basic system can be further extended, wherein the periodic communication of Consolidated Strings [(90) or (110)] to external data-source nodes [(75), (115), or (135)] consists of all the local data-source node's Consolidated Strings [(90) or (110)], the number of contacts the entity of interest has had with local law enforcement, and source-record identifiers, and wherein a data-source node [(75), (115), or (135)] is allowed to deconsolidate if there are changes in the other data-source node [(75), (115), or (135)], and a data-source node can query back to querying data-source nodes to get more information.

The basic system can be further extended, wherein the Inter-Node Consolidation is set up by communicating updated Consolidation Strings (90) to other data-source nodes (75) in a peer-to-peer fashion. This peer-to-peer communication of updated Consolidation Strings can occur in real-time via network communications. It can also occur in real-time via network communications substantially simultaneously to all external data-source nodes. Additionally, it can take place via a batch process via network communications substantially simultaneously to all external data-source nodes. If the peer-to-peer communication of updated Consolidation Strings is delayed due to network or system outage, then the updated Consolidation Strings are queued as messages to be communicated as soon as the affected systems are restored. Finally, the peer-to-peer communication of updated Consolidation Strings can occur by manually transporting physical storage devices to upload onto the peer systems that house external data-source nodes.

The basic system can be further extended, wherein the Inter-Node Consolidation is set up by effectively communicating updated Consolidation Strings (110) to other data-source nodes (115) by storing consolidation information on a central server (105), thus eliminating the need for data-source nodes to store external consolidation information. Moreover, a hybrid of this option is available with both communication of updated Consolidation Strings between regional data-source nodes (135) in a peer-to-peer fashion and communication of updated Consolidated Strings to a central server (130) by designated data-source nodes within each region.

Sixth Embodiment—A Method for Optimizing Data Queries Using Inter-Node Consolidation This embodiment encompasses a method for optimizing data queries for related records in a reliable fashion using Consolidation Strings and Inter-Node Consolidation. Refer to FIGS. 1 through 6. The basic method steps are comprised of:

providing at least one computing device [(5), (10)], wherein each computing device [(15), (20)] is communicatively coupled with the all other computing devices [(5), (10)] in a network;

providing at least one database (10), wherein each computing device [(5), (10)] able to communicate with the database, and wherein the database(s) stores record(s) of real-world entity data;

creating a hierarchical system of Consolidation Strings [(15), (25)] for each database, wherein each Consolidation String in the hierarchical system represents one or more key pieces of information relating to a real-world entity stored in the database, and wherein the information represented in each Consolidation String (30) is in a character format, and wherein the hierarchical ranking of Consolidation String priorities (25) are used to optimize database queries to find matching records for the entity of interest with substantial certainty, and wherein Inter-Node Consolidation is set up for each database, acting as a data-source node in the overall system, by periodically communicating its Consolidation Strings to external data-source nodes; and providing an end-user interface that facilitates the ability to connect to a local data-source node [(80), (95), or (120)], which allows said end-user to query the local data-source node [(75), (105), or (130)], which in turn queries any associated Consolidated Strings associated with the query for the entity to identify related records contained in other data-source nodes [(75), (105), or (135)], wherein said local data-source node communicates consolidation information to an external data-source node, and wherein the consolidation information is applied against a consolidation algorithm, and wherein the consolidation algorithm [(40), (45), (50), and (55)] looks for a pair of entity records with Consolidation Strings on the same priority level that are character-wise identical, and when such an entity match is found, the matching entity records are consolidated from an end-user's point of view (60).

The basic method can be further extended, wherein the query is able to determine whether the entity of interest has a data record in any of the other data-source nodes [(75), (105), or (130)] in the system.

The basic method can be further extended, wherein the query is able to determine how many contacts or records the entity of interest has in any of the other data-source nodes in the system.

The basic method can be further extended, wherein the query is able to determine the last time that the person or entity of interest had contact with law enforcement and where.

The basic method can be further extended, wherein the consolidated query results are displayed in the end-user interface [(80), (95), or (120)] in the form of an extra table in the detail screen for the entity of interest. In addition, a hyperlink can be provided in the consolidated query results to allow an end-user to view further details for the entity of interest on other data-source nodes, using a distributed-query approach.

The basic method can be further extended, wherein the method can be applied to law-enforcement applications, organization-related applications, real-estate-related applications, location-related applications, firearms-related applications, or vehicle-related applications.

The basic method can be further extended, wherein the periodic communication of Consolidated Strings [(90) or (110)] to external data-source nodes [(75), (115), or (135)] consists of all the local data-source node's Consolidated Strings and source-record identifiers [(90) or (110)], and wherein a data-source node [(75), (115), or (135)] is allowed to deconsolidate if there are changes in the other data-source node, and a data-source node can query back to querying data-source nodes to get more information.

The basic method can be further extended, wherein the periodic communication of Consolidated Strings to external data-source nodes [(75), (115), or (135)] consists of all the local data-source node's Consolidated Strings [(90) or (110)], the number of contacts the entity of interest has had with local law enforcement, and source-record identifiers, and wherein a data-source node [(75), (115), or (135)] is allowed to deconsolidate if there are changes in the other data-source node [(75), (115), or (135)], and a data-source node can query back to querying data-source nodes to get more information.

The basic method can be further extended, wherein the Inter-Node Consolidation is set up by communicating updated Consolidation Strings (90) to other data-source nodes (75) in a peer-to-peer fashion. This peer-to-peer communication of updated Consolidation Strings can occur in real-time via network communications. It can also occur in real-time via network communications substantially simultaneously to all external data-source nodes. Additionally, it can take place via a batch process via network communications substantially simultaneously to all external data-source nodes. If the peer-to-peer communication of updated Consolidation Strings is delayed due to network or system outage, then the updated Consolidation Strings are queued as messages to be communicated as soon as the affected systems are restored. Finally, the peer-to-peer communication of updated Consolidation Strings can occur by manually transporting physical storage devices to upload onto the peer systems that house external data-source nodes.

The basic method can be further extended, wherein the Inter-Node Consolidation is set up by effectively communicating updated Consolidation Strings (110) to other data-source nodes (115) by storing consolidation information on a central server (105), thus eliminating the need for data-source nodes to store external consolidation information. Moreover, a hybrid of this option is available with both communication of updated Consolidation Strings between regional data-source nodes (135) in a peer-to-peer fashion and communication of updated Consolidated Strings to a central server (130) by designated data-source nodes within each region.

Those skilled in the art will have no difficulty devising myriad obvious variations and improvements to the invention, all of which are intended to be encompassed within the scope of the claims which follow.

What is claimed is:

1. A system for optimizing data queries for related records in a reliable fashion, having a first computing device communicatively coupled with a second and a third computing device, and communicatively coupled to a first database that stores real-world entity data, having said second computing device communicatively coupled with said first and said third computing device, and communicatively coupled to a second database that stores real-world entity data, having said third computing device communicatively coupled with said first and said second computing device, and communicatively coupled to a third database that stores real-world entity data, comprising:

a hierarchical system of Consolidation Strings for said first database,
   wherein each Consolidation String in said hierarchical system represents one or more key pieces of information relating to a real-world entity stored in said first database,
   wherein the information represented in each Consolidation String is in a character format, and
   wherein the hierarchical ranking of Consolidation String priorities are used to optimize database queries to find matching records for at least one entity of interest with substantial certainty;

a hierarchical system of Consolidation Strings for said second database,
   wherein each Consolidation String in said hierarchical system represents one or more key pieces of information relating to a real-world entity stored in said second database,
   wherein the information represented in each Consolidation String is in a character format, and
   wherein the hierarchical ranking of Consolidation String priorities are used to optimize database queries to find matching records for at least one entity of interest with substantial certainty;

a hierarchical system of Consolidation Strings for said third database,
   wherein each Consolidation String in said hierarchical system represents one or more key pieces of information relating to a real-world entity stored in said third database,
   wherein the information represented in each Consolidation String is in a character format, and
   wherein the hierarchical ranking of Consolidation String priorities are used to optimize database queries to find matching records for at least one entity of interest with substantial certainty;

the capability of said first computing device to query said first database and cause said first database to also query said second and third databases,
   wherein an entity-record match between said first and second databases will be found and said matching entity records are consolidated from an end-user's point of view, if a pair of entity records have Consolidation Strings on the same priority level that are character-wise identical, and
   wherein an entity-record match between said first and third databases will be found and said matching entity records are consolidated from an end-user's point of view, if a pair of entity records have Consolidation Strings on the same priority level that are character-wise identical;

the capability of said second computing device to query said second database and cause said second database to also query said first and third databases,
   wherein an entity-record match between said second and first databases will be found and said matching entity records are consolidated from an end-user's point of view, if a pair of entity records have Consolidation Strings on the same priority level that are character-wise identical, and
   wherein an entity-record match between said second and third databases will be found and said matching entity records are consolidated from an end-user's point of view, if a pair of entity records have Consolidation Strings on the same priority level that are character-wise identical; and the capability of said third computing device to query said third database and cause said third database to also query said first and second databases, wherein an entity-record match between said third and first databases will be found and said matching entity records are consolidated from an end-user's point of view, if a pair of entity records have Consolidation Strings on the same priority level that are character-wise identical, and wherein an entity-record match between said third and second databases will be found and said matching entity records are consolidated from an end-user's point of view, if a pair of entity records have Consolidation Strings on the same priority level that are character-wise identical.

2. The system for optimizing data queries of claim 1, wherein:

the highest-ranked Consolidation Strings are based on positive identifiers;

the intermediate-ranked Consolidation Strings are based on demographic information; and the lowest-ranked Consolidation Strings are based on associative information that spans multiple-entity types.

3. The system for optimizing data queries of claim 1, wherein each Consolidation String is encrypted to hide original data from third-party systems.

4. The system for optimizing data queries of claim 1, wherein each Consolidation String is subjected to a hash algorithm to help ensure data security and integrity.

5. The system for optimizing data queries of claim 4, wherein said hash algorithm is a cryptographic hash algorithm concatenated with a checksum algorithm.

6. The system for optimizing data queries of claim 4, wherein record entity type and priority level are not hashed, and wherein said record entity type and priority level are used as differentiators.

7. A method for optimizing data queries for related records in a reliable fashion, to be used with a system having a first computing device communicatively coupled with a second and a third computing device, and communicatively coupled to a first database that stores real-world entity data, having said second computing device communicatively coupled with said first and said third computing device, and communicatively coupled to a second database that stores real-world entity data, having said third computing device communicatively coupled with said first and said second computing device, and communicatively coupled to a third database that stores real-world entity data, comprising the steps of:

creating a hierarchical system of Consolidation Strings for said first database, wherein each Consolidation String in said hierarchical system represents one or more key pieces of information relating to a real-world entity stored in said database, wherein the information represented in each Consolidation String is represented in a character format, and wherein the hierarchical ranking of Consolidation String priorities are used to optimize database queries to find matching records for at least one entity of interest with substantial certainty;

creating a hierarchical system of Consolidation Strings for said second database, wherein each Consolidation String in said hierarchical system represents one or more key pieces of information relating to a real-world entity stored in said database, wherein the information represented in each Consolidation String is represented in a character format, and wherein the hierarchical ranking of Consolidation String priorities are used to optimize database queries to find matching records for at least one entity of interest with substantial certainty;

creating a hierarchical system of Consolidation Strings for said third database, wherein each Consolidation String in said hierarchical system represents one or more key pieces of information relating to a real-world entity stored in said database, wherein the information represented in each Consolidation String is represented in a character format, and wherein the hierarchical ranking of Consolidation String priorities are used to optimize database queries to find matching records for at least one entity of interest with substantial certainty;

providing the capability of said first computing device to query said first database and cause said first database to also query said second and third databases, wherein an entity-record match between said first and second databases will be found and said matching entity records are consolidated from an end-user's point of view, if a pair of entity records have Consolidation Strings on the same priority level that are character-wise identical, and wherein an entity-record match between said first and third databases will be found and said matching entity records are consolidated from an end-user's point of view, if a pair of entity records have Consolidation Strings on the same priority level that are character-wise identical;

providing the capability of said second computing device to query said second database and cause said second database to also query said first and third databases, wherein an entity-record match between said second and first databases will be found and said matching entity records are consolidated from an end-user's point of view, if a pair of entity records have Consolidation Strings on the same priority level that are character-wise identical, and wherein an entity-record match between said second and third databases will be found and said matching entity records are consolidated from an end-user's point of view, if a pair of entity records have Consolidation Strings on the same priority level that are character-wise identical; and providing the capability of said third computing device to query said third database and cause said third database to also query said first and second databases, wherein an entity-record match between said third and first databases will be found and said matching entity records are consolidated from an end-user's point of view, if a pair of entity records have Consolidation Strings on the same priority level that are character-wise identical, and wherein an entity-record match between said third and second databases will be found and said matching entity records are consolidated from an end-user's point of view, if a pair of entity records have Consolidation Strings on the same priority level that are character-wise identical.

8. The method of claim 7, wherein:
the highest-ranked Consolidation Strings are based on positive identifiers;
the intermediate-ranked Consolidation Strings are based on demographic information; and
the lowest-ranked Consolidation Strings are based on associative information that spans multiple-entity types.

9. The method of claim 7, wherein each Consolidation String is encrypted to hide original data from third-party systems.

10. The method of claim 7, wherein each Consolidation String is subjected to a hash algorithm to help ensure data security and integrity.

11. The method of claim 10, wherein said hash algorithm is a cryptographic hash algorithm concatenated with a checksum algorithm.

12. The method of claim 10, wherein record entity type and priority level are not hashed, and wherein said record entity type and priority level are used as differentiators.

13. A system for optimizing data queries for related records in a reliable fashion, having a first computing device communicatively coupled with a second and a third computing device, and communicatively coupled to a first database that stores real-world entity data, having said second computing device communicatively coupled with said first and said third computing device, and communicatively coupled to a second database that stores real-world entity data, having said third computing device communicatively coupled with said first and said second computing device, and communicatively coupled to a third database that stores real-world entity data, a first end-user interface communicatively coupled to said first database, a second end-user interface communicatively coupled to said second database, and a third end-user interface communicatively coupled to said third database, comprising:

a hierarchical system of Consolidation Strings for said first database,
wherein each Consolidation String in said hierarchical system represents one or more key pieces of information relating to a real-world entity stored in said first database,
wherein the information represented in each Consolidation String is in a character format,
wherein the hierarchical ranking of Consolidation String priorities are used to optimize database queries to find matching records for at least one entity of interest with substantial certainty, and
wherein Inter-Node Consolidation is set up for said first database, acting as a first data-source node in the overall system, by periodically communicating its Consolidation Strings to external data-source nodes;

a hierarchical system of Consolidation Strings for said second database,
wherein each Consolidation String in said hierarchical system represents one or more key pieces of information relating to a real-world entity stored in said second database,
wherein the information represented in each Consolidation String is in a character format,
wherein the hierarchical ranking of Consolidation String priorities are used to optimize database queries to find matching records for at least one entity of interest with substantial certainty, and
wherein Inter-Node Consolidation is set up for said second database, acting as a second data-source node in the overall system, by periodically communicating its Consolidation Strings to external data-source nodes;

a hierarchical system of Consolidation Strings for said third database,
wherein each Consolidation String in said hierarchical system represents one or more key pieces of information relating to a real-world entity stored in said third database,
wherein the information represented in each Consolidation String is in a character format,
wherein the hierarchical ranking of Consolidation String priorities are used to optimize database queries to find matching records for at least one entity of interest with substantial certainty, and
wherein Inter-Node Consolidation is set up for said third database, acting as a third data-source node in the overall system, by periodically communicating its Consolidation Strings to external data-source nodes;

the capability of said first end-user interface to allow a first end-user to query said first data-source node, which in turn queries any associated Consolidated Strings associated with the query for the entity to identify related records contained in said second and third data-source nodes,
wherein said first data-source node communicates consolidation information to said second and third external data-source nodes,
wherein said consolidation information is applied against a consolidation algorithm in each said second and third data-source nodes, and
wherein said consolidation algorithm looks for a pair of entity records with Consolidation Strings on the same priority level that are character-wise identical, and when such an entity match is found, said matching entity records are consolidated from an end-user's point of view;

the capability of said second end-user interface to allow a second end-user to query said second data-source node, which in turn queries any associated Consolidated Strings associated with the query for the entity to identify related records contained in said first and third data-source nodes,
wherein said second data-source node communicates consolidation information to said first and third data-source nodes,
wherein said consolidation information is applied against a consolidation algorithm in each said first and third data-source nodes, and
wherein said consolidation algorithm looks for a pair of entity records with Consolidation Strings on the same priority level that are character-wise identical, and when such an entity match is found, said matching entity records are consolidated from an end-user's point of view; and the capability of said third end-user interface to allow a third end-user to query said third data-source node, which in turn queries any associated Consolidated Strings associated with the query for the entity to identify related records contained in said first and second data-source nodes,
wherein said third data-source node communicates consolidation information to said first and second data-source nodes,
wherein said consolidation information is applied against a consolidation algorithm in each said first and second data-source nodes, and
wherein said consolidation algorithm looks for a pair of entity records with Consolidation Strings on the same priority level that are character-wise identical, and when such an entity match is found, said matching entity records are consolidated from an end-user's point of view.

14. The system for optimizing data queries in claim 13, wherein each said query is able to determine whether the entity of interest has a data record in any of the other data-source nodes in the system.

15. The system for optimizing data queries in claim 13, wherein the consolidated query results are displayed in the end-user interface from where the query originated in the form of an extra table in the detail screen for the entity of interest.

16. The system for optimizing data queries in claim 15, wherein a hyperlink is provided in said consolidated query results to allow an end-user to view further details for the entity of interest on other data-source nodes, using a distributed-query approach.

17. The system for optimizing data queries in claim 13, wherein said system is configured for use in an application selected from the group consisting of law-enforcement, organizations, real estate, locations, firearms, and vehicles.

18. The system for optimizing data queries in claim 13, wherein said periodic communication of Consolidated Strings to other data-source nodes consists of all of the communication-originating data-source node's Consolidated Strings and source-record identifiers,
  wherein a data-source node is allowed to deconsolidate if there are changes in the communication-originating data-source node, and
  a data-source node can query back to querying data-source nodes to get more information.

19. The system for optimizing data queries in claim 13, wherein said Inter-Node Consolidation is set up by communicating updated Consolidation Strings to other data-source nodes in a peer-to-peer fashion.

20. The system for optimizing data queries in claim 19, wherein said peer-to-peer communication of updated Consolidation Strings occurs in real-time via network communications.

21. The system for optimizing data queries in claim 19, wherein said peer-to-peer communication of updated Consolidation Strings occurs in a batch process via network communications substantially simultaneously from the communication-originating data-source node to all other data-source nodes.

22. The system for optimizing data queries in claim 19, wherein if said peer-to-peer communication of updated Consolidation Strings is delayed due to network or system outage, then said updated Consolidation Strings are queued as messages to be communicated as soon as the affected systems are restored.

23. The system for optimizing data queries in claim 19, wherein said peer-to-peer communication of updated Consolidation Strings occurs by manually transporting physical storage devices with data from the communication-originating data-source node to upload onto said peer systems that house other data-source nodes.

24. The system for optimizing data queries in claim 13, wherein said Inter-Node Consolidation is set up by effectively communicating updated Consolidation Strings to other data-source nodes by storing consolidation information on a central server, thus eliminating the need for data-source nodes to store external consolidation information.

25. The system for optimizing data queries in claim 13, wherein said Inter-Node Consolidation is set up using a hybrid consolidation comprising:
  the communication of updated Consolidation Strings between regional data-source nodes in a peer-to-peer fashion; and
  the communication of updated Consolidated Strings to a central server by designated data-source nodes within each region.

26. A method for optimizing data queries for related records in a reliable fashion, to be used with a system having a first computing device communicatively coupled with a second and a third computing device, and communicatively coupled to a first database that stores real-world entity data, having said second computing device communicatively coupled with said first and said third computing device, and communicatively coupled to a second database that stores real-world entity data, having said third computing device communicatively coupled with said first and said second computing device, and communicatively coupled to a third database that stores real-world entity data, a first end-user interface communicatively coupled to said first database, a second end-user interface communicatively coupled to said second database, and a third end-user interface communicatively coupled to said third database, comprising:
  providing a hierarchical system of Consolidation Strings for said first database,
    wherein each Consolidation String in said hierarchical system represents one or more key pieces of information relating to a real-world entity stored in said first database,
    wherein the information represented in each Consolidation String is in a character format,
    wherein the hierarchical ranking of Consolidation String priorities are used to optimize database queries to find matching records for at least one entity of interest with substantial certainty, and
    wherein Inter-Node Consolidation is set up for said first database, acting as a first data-source node in the overall system, by periodically communicating its Consolidation Strings to other data-source nodes;
  providing a hierarchical system of Consolidation Strings for said second database,
    wherein each Consolidation String in said hierarchical system represents one or more key pieces of information relating to a real-world entity stored in said second database,
    wherein the information represented in each Consolidation String is in a character format,
    wherein the hierarchical ranking of Consolidation String priorities are used to optimize database queries to find matching records for at least one entity of interest with substantial certainty, and
    wherein Inter-Node Consolidation is set up for said second database, acting as a second data-source node in the overall system, by periodically communicating its Consolidation Strings to other data-source nodes;
  providing a hierarchical system of Consolidation Strings for said third database,
    wherein each Consolidation String in said hierarchical system represents one or more key pieces of information relating to a real-world entity stored in said third database,
    wherein the information represented in each Consolidation String is in a character format,
    wherein the hierarchical ranking of Consolidation String priorities are used to optimize database queries to find matching records for at least one entity of interest with substantial certainty, and wherein Inter-Node Consolidation is set up for said third database, acting as a third data-source node in the overall system, by periodically communicating its Consolidation Strings to other data-source nodes;

providing the capability of said first end-user interface to allow a first end-user to query said first data-source node, which in turn queries any associated Consolidated Strings associated with the query for the entity to identify related records contained in said second and third data-source nodes,
  wherein said first data-source node communicates consolidation information to said second and third data-source nodes,
  wherein said consolidation information is applied against a consolidation algorithm in each said second and third data-source nodes, and
  wherein said consolidation algorithm looks for a pair of entity records with Consolidation Strings on the same priority level that are character-wise identical, and when such an entity match is found, said matching entity records are consolidated from an end-user's point of view;

providing the capability of said second end-user interface to allow a second end-user to query said second data-source node, which in turn queries any associated Consolidated Strings associated with the query for the entity to identify related records contained in said first and third data-source nodes,
  wherein said second data-source node communicates consolidation information to said first and third data-source nodes,
  wherein said consolidation information is applied against a consolidation algorithm in each said first and third data-source nodes, and
  wherein said consolidation algorithm looks for a pair of entity records with Consolidation Strings on the same priority level that are character-wise identical, and when such an entity match is found, said matching entity records are consolidated from an end-user's point of view; and providing the capability of said third end-user interface to allow a third end-user to query said third data-source node, which in turn queries any associated Consolidated Strings associated with the query for the entity to identify related records contained in said first and second data-source nodes,
  wherein said third data-source node communicates consolidation information to said first and second data-source nodes,
  wherein said consolidation information is applied against a consolidation algorithm in each said first and second data-source nodes,
  wherein said consolidation algorithm looks for a pair of entity records with Consolidation Strings on the same priority level that are character-wise identical, and when such an entity match is found, said matching entity records are consolidated from an end-user's point of view.

27. The system for optimizing data queries in claim 26, wherein each said query is able to determine whether the entity of interest has a data record in any of the other data-source nodes in the system.

28. The method in claim 26, wherein the consolidated query results are displayed in the end-user interface from where the query originated in the form of an extra table in the detail screen for the entity of interest.

29. The method in claim 28, wherein a hyperlink is provided in said consolidated query results to allow an end-user to view further details for the entity of interest on other data-source nodes, using a distributed-query approach.

30. The method in claim 26, wherein said system is configured for use in an application selected from the group consisting of law-enforcement, organizations, real estate, locations, firearms, and vehicles.

31. The method in claim 26, wherein said periodic communication of Consolidated Strings to other data-source nodes consists of all of the communication-originating data-source node's Consolidated Strings and source-record identifiers,
  wherein a data-source node is allowed to deconsolidate if there are changes in the communication-originating data-source node, and
  a data-source node can query back to querying data-source nodes to get more information.

32. The method in claim 26, wherein said Inter-Node Consolidation is set up by communicating updated Consolidation Strings to other data-source nodes in a peer-to-peer fashion.

33. The method in claim 32, wherein said peer-to-peer communication of updated Consolidation Strings occurs in real-time via network communications.

34. The method in claim 32, wherein said peer-to-peer communication of updated Consolidation Strings occurs in a batch process via network communications substantially simultaneously from the communication-originating data-source node to all other data-source nodes.

35. The method in claim 32, wherein if said peer-to-peer communication of updated Consolidation Strings is delayed due to network or system outage, then said updated Consolidation Strings are queued as messages to be communicated as soon as the affected systems are restored.

36. The method in claim 32, wherein said peer-to-peer communication of updated Consolidation Strings occurs by manually transporting physical storage devices with data from the communication-originating data-source node to upload onto said peer systems that house other data-source nodes.

37. The method in claim 26, wherein said Inter-Node Consolidation is set up by effectively communicating updated Consolidation Strings to other data-source nodes by storing consolidation information on a central server, thus eliminating the need for data-source nodes to store external consolidation information.

38. The method in claim 26, wherein said Inter-Node Consolidation is set up using a hybrid consolidation comprising:
  the communication of updated Consolidation Strings between regional data-source nodes in a peer-to-peer fashion; and
  the communication of updated Consolidated Strings to a central server by designated data-source nodes within each region.

39. A system for optimizing data queries for related records in a reliable fashion, having a first computing device communicatively coupled with a second computing device, and communicatively coupled to a first database that stores real-world entity data, having said second computing device communicatively coupled with said first computing device, and communicatively coupled to a second database that stores real-world entity data, comprising:

a hierarchical system of Consolidation Strings for said first database,
  wherein each Consolidation String in said hierarchical system represents one or more key pieces of information relating to a real-world entity stored in said first database,
  wherein the information represented in each Consolidation String is in a character format, and
  wherein the hierarchical ranking of Consolidation String priorities are used to optimize database queries to find matching records for at least one entity of interest with substantial certainty;
a hierarchical system of Consolidation Strings for said second database,
  wherein each Consolidation String in said hierarchical system represents one or more key pieces of information relating to a real-world entity stored in said second database,
  wherein the information represented in each Consolidation String is in a character format, and
  wherein the hierarchical ranking of Consolidation String priorities are used to optimize database queries to find matching records for at least one entity of interest with substantial certainty;
the capability of said first computing device to query said first database and cause said first database to also query said second database,
  wherein an entity-record match between said first and second databases will be found and said matching entity records are consolidated from an end-user's point of view, if a pair of entity records have Consolidation Strings on the same priority level that are character-wise identical; and
the capability of said second computing device to query said second database and cause said second database to also query said first database,
  wherein an entity-record match between said second and first databases will be found and said matching entity records are consolidated from an end-user's point of view, if a pair of entity records have Consolidation Strings on the same priority level that are character-wise identical.

40. The system for optimizing data queries of claim 39, wherein:
the highest-ranked Consolidation Strings are based on positive identifiers;
the intermediate-ranked Consolidation Strings are based on demographic information; and
the lowest-ranked Consolidation Strings are based on associative information that spans multiple-entity types.

41. The system for optimizing data queries of claim 39, wherein each Consolidation String is encrypted to hide original data from third-party systems.

42. The system for optimizing data queries of claim 39, wherein each Consolidation String is subjected to a hash algorithm to help ensure data security and integrity.

43. The system for optimizing data queries of claim 42, wherein said hash algorithm is a cryptographic hash algorithm concatenated with a checksum algorithm.

44. The system for optimizing data queries of claim 42, wherein record entity type and priority level are not hashed, and wherein said record entity type and priority level are used as differentiators.

45. A method for optimizing data queries for related records in a reliable fashion, to be used with a system having a first computing device communicatively coupled with a second computing device, and communicatively coupled to a first database that stores real-world entity data, having said second computing device communicatively coupled with said first computing device, and communicatively coupled to a second database that stores real-world entity data, comprising the steps of:
creating a hierarchical system of Consolidation Strings for said first database,
  wherein each Consolidation String in said hierarchical system represents one or more key pieces of information relating to a real-world entity stored in said database,
  wherein the information represented in each Consolidation String is represented in a character format, and
  wherein the hierarchical ranking of Consolidation String priorities are used to optimize database queries to find matching records for at least one entity of interest with substantial certainty;
creating a hierarchical system of Consolidation Strings for said second database,
  wherein each Consolidation String in said hierarchical system represents one or more key pieces of information relating to a real-world entity stored in said database,
  wherein the information represented in each Consolidation String is represented in a character format, and
  wherein the hierarchical ranking of Consolidation String priorities are used to optimize database queries to find matching records for at least one entity of interest with substantial certainty;
providing the capability of said first computing device to query said first database and cause said first database to also query said second database,
  wherein an entity-record match between said first and second databases will be found and said matching entity records are consolidated from an end-user's point of view, if a pair of entity records have Consolidation Strings on the same priority level that are character-wise identical; and
providing the capability of said second computing device to query said second database and cause said second database to also query said first database,
  wherein an entity-record match between said second and first databases will be found and said matching entity records are consolidated from an end-user's point of view, if a pair of entity records have Consolidation Strings on the same priority level that are character-wise identical.

46. The method of claim 45, wherein:
the highest-ranked Consolidation Strings are based on positive identifiers;
the intermediate-ranked Consolidation Strings are based on demographic information; and
the lowest-ranked Consolidation Strings are based on associative information that spans multiple-entity types.

47. The method of claim 45, wherein each Consolidation String is encrypted to hide original data from third-party systems.

48. The method of claim 45, wherein each Consolidation String is subjected to a hash algorithm to help ensure data security and integrity.

49. The method of claim 48, wherein said hash algorithm is a cryptographic hash algorithm concatenated with a checksum algorithm.

50. The method of claim 48, wherein record entity type and priority level are not hashed, and wherein said record entity type and priority level are used as differentiators.

51. A system for optimizing data queries for related records in a reliable fashion, having a first computing device communicatively coupled with a second computing device, and communicatively coupled to a first database that stores real-world entity data, having said second computing device communicatively coupled with said first computing device, and communicatively coupled to a second database that stores real-world entity data, a first end-user interface communicatively coupled to said first database, and a second end-user interface communicatively coupled to said second database, comprising:

a hierarchical system of Consolidation Strings for said first database,
wherein each Consolidation String in said hierarchical system represents one or more key pieces of information relating to a real-world entity stored in said first database,
wherein the information represented in each Consolidation String is in a character format,
wherein the hierarchical ranking of Consolidation String priorities are used to optimize database queries to find matching records for at least one entity of interest with substantial certainty, and
wherein Inter-Node Consolidation is set up for said first database, acting as a first data-source node in the overall system, by periodically communicating its Consolidation Strings to a second data-source node;

a hierarchical system of Consolidation Strings for said second database,
wherein each Consolidation String in said hierarchical system represents one or more key pieces of information relating to a real-world entity stored in said second database,
wherein the information represented in each Consolidation String is in a character format,
wherein the hierarchical ranking of Consolidation String priorities are used to optimize database queries to find matching records for at least one entity of interest with substantial certainty, and
wherein Inter-Node Consolidation is set up for said second database, acting as a second data-source node in the overall system, by periodically communicating its Consolidation Strings to said first data-source node;

the capability of said first end-user interface to allow a first end-user to query said first data-source node, which in turn queries any associated Consolidated Strings associated with the query for the entity to identify related records contained in said second data-source node,
wherein said first data-source node communicates consolidation information to said second data-source node,
wherein said consolidation information is applied against a consolidation algorithm in said second data-source node, and
wherein said consolidation algorithm looks for a pair of entity records with Consolidation Strings on the same priority level that are character-wise identical, and when such an entity match is found, said matching entity records are consolidated from an end-user's point of view; and the capability of said second end-user interface to allow a second end-user to query said second data-source node, which in turn queries any associated Consolidated Strings associated with the query for the entity to identify related records contained in said first data-source node,
wherein said second data-source node communicates consolidation information to said first data-source node,
wherein said consolidation information is applied against a consolidation algorithm in said first data-source node, and
wherein said consolidation algorithm looks for a pair of entity records with Consolidation Strings on the same priority level that are character-wise identical, and when such an entity match is found, said matching entity records are consolidated from an end-user's point of view.

52. The system for optimizing data queries in claim 51, wherein each said query is able to determine whether the entity of interest has a data record in another data-source node in the system.

53. The system for optimizing data queries in claim 51, wherein the consolidated query results are displayed in the end-user interface from where the query originated in the form of an extra table in the detail screen for the entity of interest.

54. The system for optimizing data queries in claim 53, wherein a hyperlink is provided in said consolidated query results to allow an end-user to view further details for the entity of interest on another data-source node, using a distributed-query approach.

55. The system for optimizing data queries in claim 51, wherein said system is configured for use in an application selected from the group consisting of law-enforcement, organizations, real estate, locations, firearms, and vehicles.

56. The system for optimizing data queries in claim 51, wherein said periodic communication of Consolidated Strings to another data-source node consists of all of the communication-originating data-source node's Consolidated Strings and source-record identifiers,
wherein a data-source node is allowed to deconsolidate if there are changes in the communication-originating data-source node, and
a data-source node can query back to querying data-source nodes to get more information.

57. The system for optimizing data queries in claim 51, wherein said Inter-Node Consolidation is set up by communicating updated Consolidation Strings to another data-source node in a peer-to-peer fashion.

58. The system for optimizing data queries in claim 57, wherein said peer-to-peer communication of updated Consolidation Strings occurs in real-time via network communications.

59. The system for optimizing data queries in claim 57, wherein said peer-to-peer communication of updated Consolidation Strings occurs in a batch process via network communications substantially simultaneously from the communication-originating data-source node to another data-source node.

60. The system for optimizing data queries in claim 57, wherein if said peer-to-peer communication of updated Consolidation Strings is delayed due to network or system outage, then said updated Consolidation Strings are queued as messages to be communicated as soon as the affected systems are restored.

61. The system for optimizing data queries in claim 57, wherein said peer-to-peer communication of updated Consolidation Strings occurs by manually transporting physical storage devices with data from the communication-originating data-source node to upload onto said a peer system that houses another data-source node.

62. The system for optimizing data queries in claim 51, wherein said Inter-Node Consolidation is set up by effectively communicating updated Consolidation Strings to another data-source node by storing consolidation information on a central server, thus eliminating the need for data-source nodes to store external consolidation information.

63. The system for optimizing data queries in claim 51, wherein said Inter-Node Consolidation is set up using a hybrid comprising:
the communication of updated Consolidation Strings between regional data-source nodes in a peer-to-peer fashion; and
the communication of updated Consolidated Strings to a central server by designated data-source nodes within each region.

64. A method for optimizing data queries for related records in a reliable fashion, to be used with a system having a first computing device communicatively coupled with a second computing device, and communicatively coupled to a first database that stores real-world entity data, having said second computing device communicatively coupled with said first computing device, and communicatively coupled to a second database that stores real-world entity data, a first end-user interface communicatively coupled to said first database, and a second end-user interface communicatively coupled to said second database, comprising:
providing a hierarchical system of Consolidation Strings for said first database,
wherein each Consolidation String in said hierarchical system represents one or more key pieces of information relating to a real-world entity stored in said first database,
wherein the information represented in each Consolidation String is in a character format,
wherein the hierarchical ranking of Consolidation String priorities are used to optimize database queries to find matching records for at least one entity of interest with substantial certainty, and
wherein Inter-Node Consolidation is set up for said first database, acting as a first data-source node in the overall system, by periodically communicating its Consolidation Strings to a second data-source node;
providing a hierarchical system of Consolidation Strings for said second database,
wherein each Consolidation String in said hierarchical system represents one or more key pieces of information relating to a real-world entity stored in said second database,
wherein the information represented in each Consolidation String is in a character format,
wherein the hierarchical ranking of Consolidation String priorities are used to optimize database queries to find matching records for at least one entity of interest with substantial certainty, and
wherein Inter-Node Consolidation is set up for said second database, acting as a second data-source node in the overall system, by periodically communicating its Consolidation Strings to said first data-source node;
providing the capability of said first end-user interface to allow a first end-user to query said first data-source node, which in turn queries any associated Consolidation Strings associated with the query for the entity to identify related records contained in said second data-source node,
wherein said first data-source node communicates consolidation information to said second data-source node,
wherein said consolidation information is applied against a consolidation algorithm in said second data-source node, and
wherein said consolidation algorithm looks for a pair of entity records with Consolidation Strings on the same priority level that are character-wise identical, and when such an entity match is found, said matching entity records are consolidated from an end-user's point of view; and
providing the capability of said second end-user interface to allow a second end-user to query said second data-source node, which in turn queries any associated Consolidated Strings associated with the query for the entity to identify related records contained in said first data-source node,
wherein said second data-source node communicates consolidation information to said first data-source node,
wherein said consolidation information is applied against a consolidation algorithm in said first data-source node, and
wherein said consolidation algorithm looks for a pair of entity records with Consolidation Strings on the same priority level that are character-wise identical, and when such an entity match is found, said matching entity records are consolidated from an end-user's point of view.

65. The system for optimizing data queries in claim 64, wherein each said query is able to determine whether the entity of interest has a data record in another data-source node in the system.

66. The method in claim 64, wherein the consolidated query results are displayed in the end-user interface from where the query originated in the form of an extra table in the detail screen for the entity of interest.

67. The method in claim 66, wherein a hyperlink is provided in said consolidated query results to allow an end-user to view further details for the entity of interest on another data-source node, using a distributed-query approach.

68. The method in claim 64, wherein said system is configured for use in an application selected from the group consisting of law-enforcement, organizations, real estate, locations, firearms, and vehicles.

69. The method in claim 64, wherein said periodic communication of Consolidated Strings to another data-source node consists of all of the communication-originating data-source node's Consolidated Strings and source-record identifiers,
wherein a data-source node is allowed to deconsolidate if there are changes in the communication-originating data-source node, and
a data-source node can query back to querying data-source nodes to get more information.

70. The method in claim 64, wherein said Inter-Node Consolidation is set up by communicating updated Consolidation Strings to another data-source node in a peer-to-peer fashion.

71. The method in claim 70, wherein said peer-to-peer communication of updated Consolidation Strings occurs in real-time via network communications.

72. The method in claim 70, wherein said peer-to-peer communication of updated Consolidation Strings occurs in a batch process via network communications substantially simultaneously from the communication-originating data-source node to another data-source node.

73. The method in claim 70, wherein if said peer-to-peer communication of updated Consolidation Strings is delayed due to network or system outage, then said updated Consolidation Strings are queued as messages to be communicated as soon as the affected systems are restored.

74. The method in claim 70, wherein said peer-to-peer communication of updated Consolidation Strings occurs by manually transporting physical storage devices with data from the communication-originating data-source node to upload onto said a peer system that houses another data-source node.

75. The method in claim 64, wherein said Inter-Node Consolidation is set up by effectively communicating updated Consolidation Strings to another data-source node by storing consolidation information on a central server, thus eliminating the need for data-source nodes to store external consolidation information.

76. The method in claim 64, wherein said Inter-Node Consolidation is set up using a hybrid comprising:
- the communication of updated Consolidation Strings between regional data-source nodes in a peer-to-peer fashion; and
- the communication of updated Consolidated Strings to a central server by designated data-source nodes within each region.

* * * * *